United States Patent [19]
Peterson

[11] Patent Number: 5,722,793
[45] Date of Patent: Mar. 3, 1998

[54] METHOD AND DEVICE FOR CONTINUOUSLY LAYING AND BURYING A FLEXIBLE SUBMARINE CONDUIT

[75] Inventor: Kevin Peterson, Boulogne-Billancourt, France

[73] Assignee: Coflexip, Boulogne-Billancourt, France

[21] Appl. No.: 537,848

[22] PCT Filed: Apr. 15, 1994

[86] PCT No.: PCT/FR94/00425

§ 371 Date: Oct. 20, 1995

§ 102(e) Date: Oct. 20, 1995

[87] PCT Pub. No.: WO94/24377

PCT Pub. Date: Oct. 27, 1994

[30] Foreign Application Priority Data

Apr. 21, 1993 [FR] France .................. 93 04682

[51] Int. Cl.⁶ .................................... F16L 1/12
[52] U.S. Cl. .................. 405/164; 405/159; 405/158
[58] Field of Search .................. 405/158, 159, 405/160, 164, 180, 168.3

[56] References Cited

U.S. PATENT DOCUMENTS

| | | | |
|---|---|---|---|
| 3,434,297 | 3/1969 | Gretter et al. | 405/160 |
| 4,010,619 | 3/1977 | Hightower et al. | 61/69 |
| 4,190,382 | 2/1980 | Schmitz et al. | 405/164 X |
| 4,362,436 | 12/1982 | Harmstorf | 405/164 X |
| 4,492,492 | 1/1985 | Izawa et al. | 405/160 |
| 4,537,530 | 8/1985 | Yamamura et al. | 405/160 |
| 4,749,308 | 6/1988 | Izawa | 405/159 |
| 4,812,079 | 3/1989 | Johnson et al. | 405/164 |
| 4,892,443 | 1/1990 | Kunze et al. | 405/164 |

FOREIGN PATENT DOCUMENTS

2 278 854  2/1976  France.

OTHER PUBLICATIONS

Baumaschine & Bautechnik—BMT, vol. 28, No. 6, Jun. 1981, Wiesbaden DE pp. 301–303; Christian Benoit p. 302, paragraph 6.

NTT Review, vol. 4, No. 5, Sep. 1992, Tokyo JP pp. 100–102, Yoshiki Shiba et al, "Underwater Robot for Submarine Cable Maintenance".

Petrole Et Entreprise, No. 32, Mar. 1986, Paris FR pp. 16–18, Claude Burckbachler et al "Les aterrages".

Primary Examiner—Tamara L. Graysay
Assistant Examiner—Frederick L. Lagman
Attorney, Agent, or Firm—Jacobson, Price, Holman & Stern, PLLC

[57] ABSTRACT

It is characterized in that it consists in using a self-propelled sea plough (1) remote-controlled via a control flexible (2), said sea plough carrying at least one reel (6) of flexible conduit (7), controlling said sea plough from a site (5) so as to lay and bury a length of the flexible conduit up to a first predetermined point ($P_1$), controlling said sea plough beyond said first predetermined point from another site (10), continuing laying and burying of the flexible conduit as far as a second predetermined point ($P_2$), one of said sites being the land (5) and the other comprising a waterborne vessel.

Applications include simultaneous laying and burying of flexible conduits such as optical cables, coaxial cables for analogue transmission, electrical cables, single or multiple flexible tubular conduits.

16 Claims, 10 Drawing Sheets

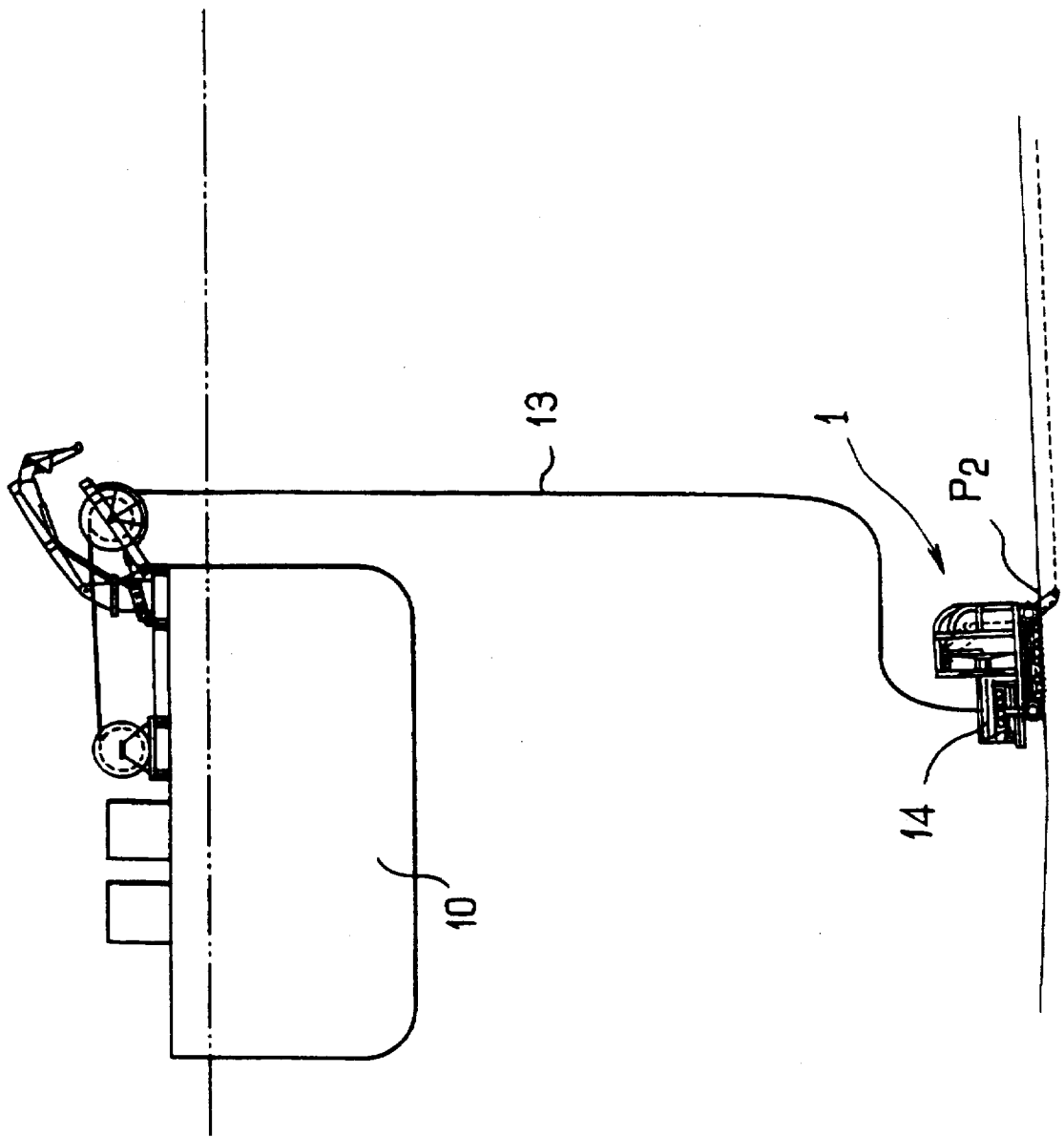

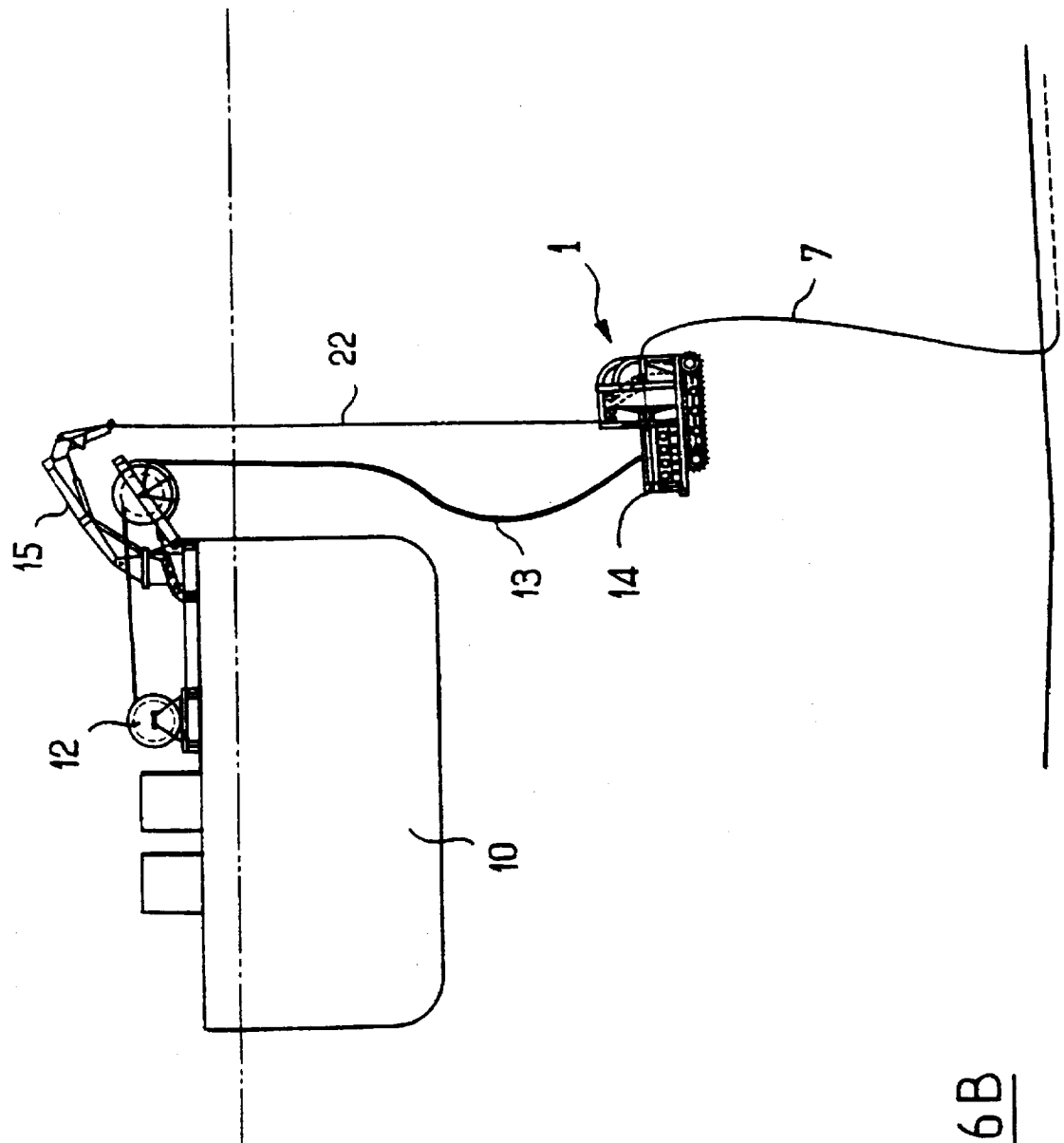
FIG_6B

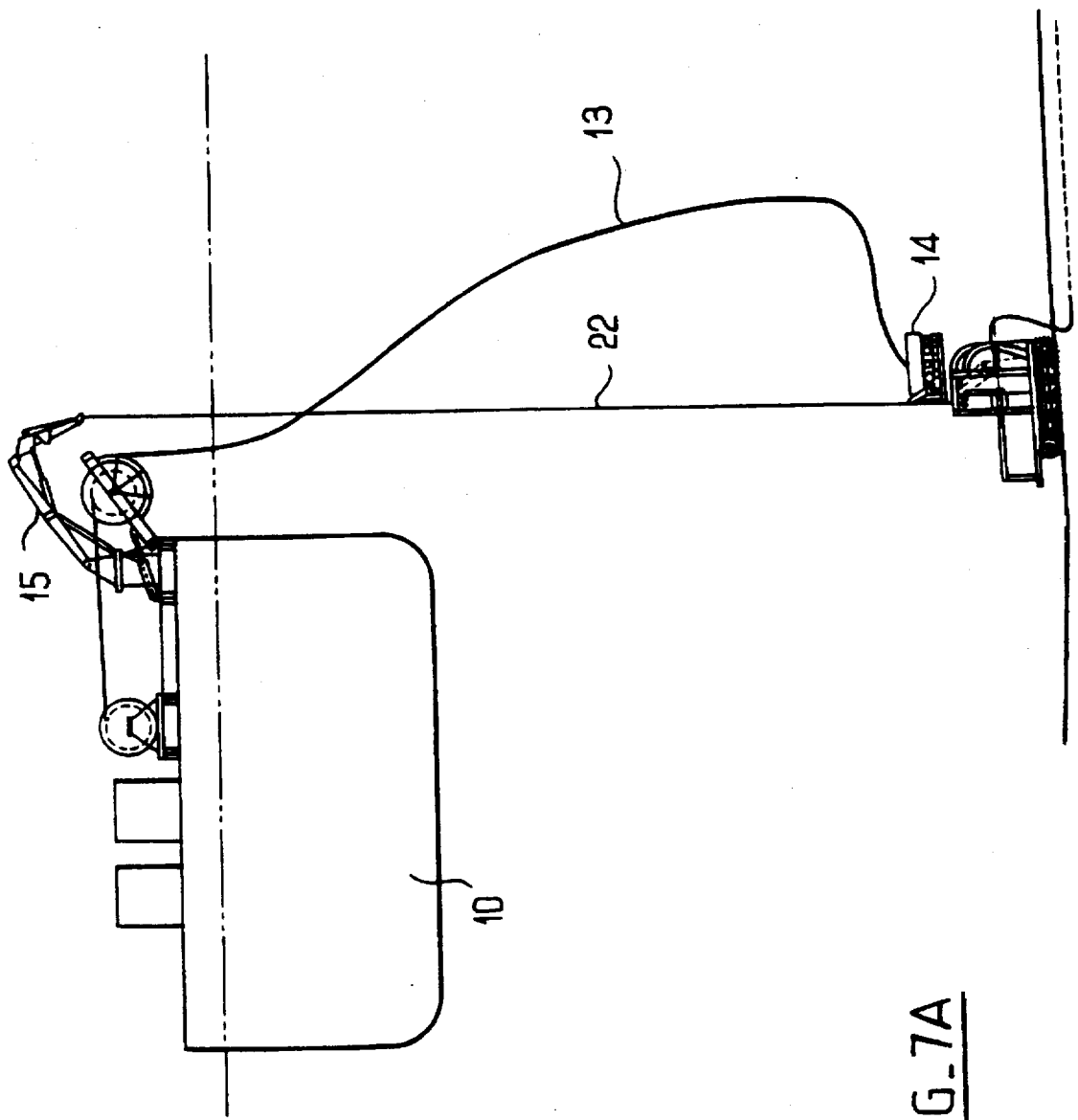

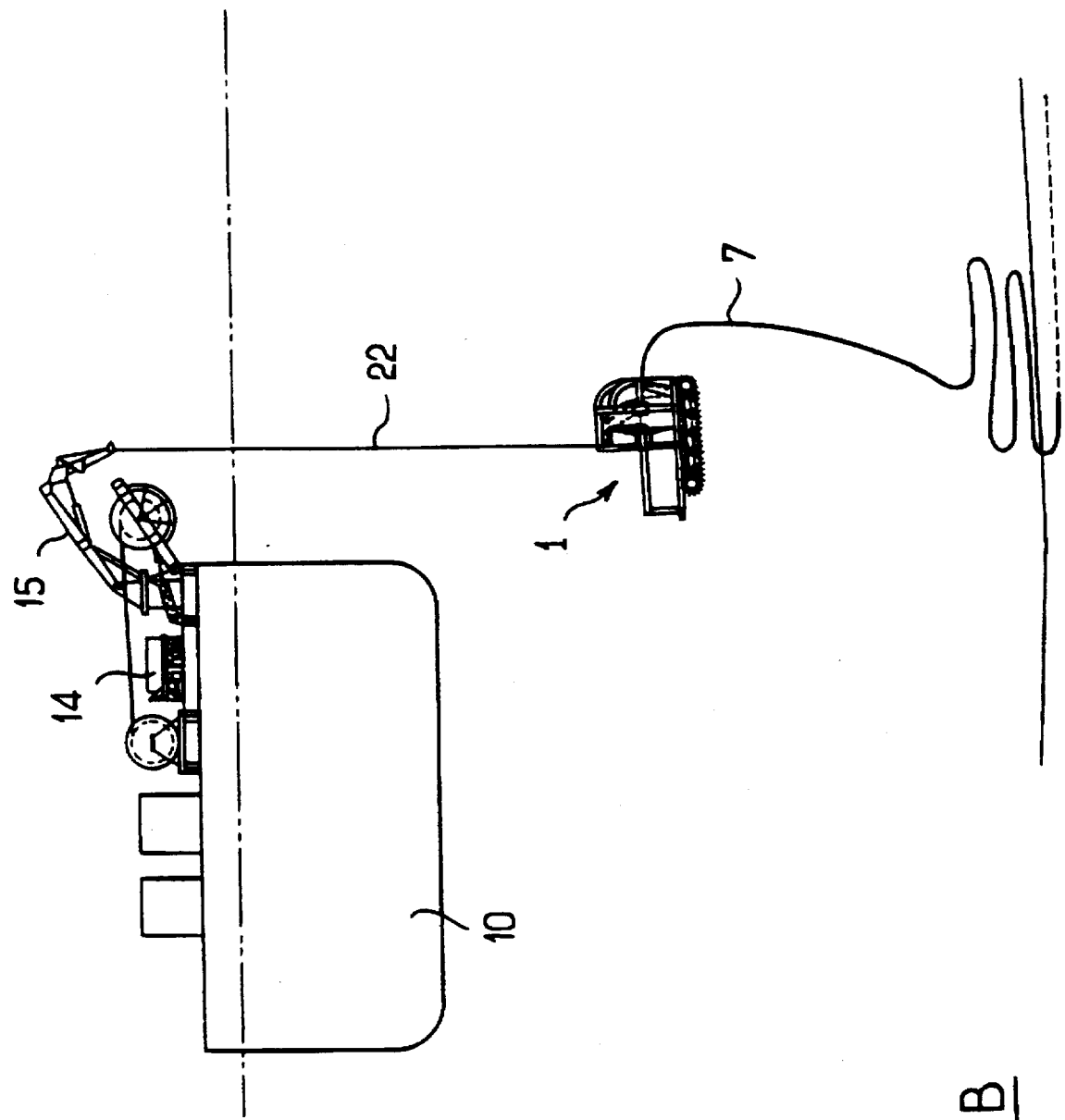

METHOD AND DEVICE FOR CONTINUOUSLY LAYING AND BURYING A FLEXIBLE SUBMARINE CONDUIT

The present invention relates to a method and device for continuously laying and burying a flexible submarine conduit, for example an optical fibre transmission cable.

The growth of international and even intercontinental links by means of submarine cables, in particular by means of telecommunication cables such as telephone cables, has lead researchers to design and manufacture methods and devices for laying long lengths of cable on the sea bed.

At an early stage it became apparent that merely laying a cable on the sea bed is unsatisfactory in many cases. The cable is subject to frequent aggression of various kinds, for example by ships' anchors, fishing boats' nets, the effects of swell and currents and the movement of the cable laying vessel itself. One solution is to protect the cable by providing it with reinforcing armouring to increase its mechanical strength and its weight over that part of its length down to a depth of approximately 1000 m. Beyond this depth, experts regard the risk of damage to the cable due to fishing and shipping activities to be negligible.

Another known technique is to lay a layer of gravel or pebbles on top of the cable, known as "gravel dumping", or sacks of sand or cement. In some cases the weight of the cable is increased sufficiently for it to become buried in the sea bed of its own accord.

A further solution, in increasingly widespread use, since it offers improved cable protection, is to bury the cable in a trench dug into the sea bed.

When two distant points are to be linked by a submarine cable a specialised cable ship is employed having storage means, baskets for example which are adapted to contain all of the cable to be laid, a sea plough that is used to bury the cable and all the mechanical, hydraulic and power equipment needed for laying the cable and to operate the sea plough.

The first operation is to pay out one end of the cable from the cable ship so that this end can be taken ashore. The cable ship and the shore are separated by a distance of several hundred meters, possibly more than one kilometer. During this first landing operation the heavy cable is dragged along the sea bed, generating high friction forces. The cable can be lightened so that it floats on and is drawn along the surface, but in this case the cable is subject to high loads due to swell and currents. In all cases it has been proved necessary to reinforce the cable in the part drawn ashore.

The second operation is to submerge the sea plough, linked to the cable ship by the towing cable adapted to withstand loads of several tonnes. The sea plough is controlled from the cable ship by means of an umbilical link and buries the cable as the cable ship moves forward and as the cable is laid on the sea bed.

To bury the part of the cable laid without burying it in the landing area, which therefore remains exposed on the sea bed, it is necessary to use different specialised equipment to carry out a procedure known as burying after laying.

A major drawback of this procedure is that it involves several different operations, including cable protection operations, and several different items of equipment.

Another drawback is that long lengths of reinforced cable have to be put on board the cable ship, the reinforcement of the cable increasing its diameter and its weight and representing an additional load for the cable ship and the equipment, especially the sea plough. The costs of laying is substantially increased, as is that of manufacturing the cable, of course.

The same operations naturally have to be carried out on reaching the other end of the link, with the same drawbacks.

When the cable is relatively fragile and light in weight, as is the case with an optical cable, the reinforcement must be proportionately greater.

The present invention aims to remedy the above drawbacks and to provide a simultaneous cable laying and burying method that is easy to use.

An object of the present invention is to carry out cable laying and burying simultaneously in one operation covering a landing area and an offshore area, continuously and using less equipment.

Another object of the present invention is to use a single self propelled sea plough carrying the cable on a reel and remote controlled either from the shore or from a ship.

Another object of the present invention is to enable simultaneous laying and burying of a cable between two sites on land separated by a stretch of water.

Another object of the present invention is to enable simultaneous laying and burying of a cable between a site on land and an offshore structure or between a site on land and a joint between the cable and another cable laid by a cable ship.

The present invention consists in a method for continuously laying and burying an underwater flexible conduit, the flexible conduit being stored on at least one reel, characterised in that it consists in:

using a self-propelled sea plough remote-controlled via a control flexible, said sea plough carrying at least one reel of flexible conduit, controlling said sea plough from a site so as to lay and bury a length of the flexible conduit up to a first predetermined point, controlling said sea plough beyond said first predetermined point from another site, continuing laying and burying of the flexible conduit as far as a second predetermined point, one of said sites being the land and the other comprising a waterborne vessel.

One advantage of the present invention is the ability to use a cable with no special reinforcement and without requiring separate laying and burying operations.

Another advantage is the possibility of using a new generation of ships that are not specialised cable ships and are designed for other uses, such as offshore oil production.

In accordance with another feature of the invention, the sea plough is controlled from land via an umbilical and from the waterborne vessel via another umbilical, said other umbilical being connected to an underwater robot at the end opposite the waterborne vessel so that it can be connected to the sea plough for controlling the latter from the waterborne vessel. Thus techniques can be used that have been employed in other applications such as oil production.

The present invention further consists in a device for laying and burying a flexible conduit of the type comprising a self-propelled sea plough remote-controlled via an umbilical connected to a sea plough control unit, characterised in that it further comprises another remote control unit for the sea plough and a feed reel of the flexible conduit carried by the sea plough for simultaneous laying and burying in deep water.

Other advantages and features will emerge more clearly from a reading of the description of one embodiment of the method of the invention and the appended drawings, in which:

FIG. 4 is a diagram shown the sea plough in a second phase of cable laying and burying, controlled from the cable laying vessel.

FIGS. 6A and 6B are diagrams showing a first way of raising the sea plough.

FIGS. 7A and 7B are diagrams showing a different way of raising the sea plough.

Figure 1:
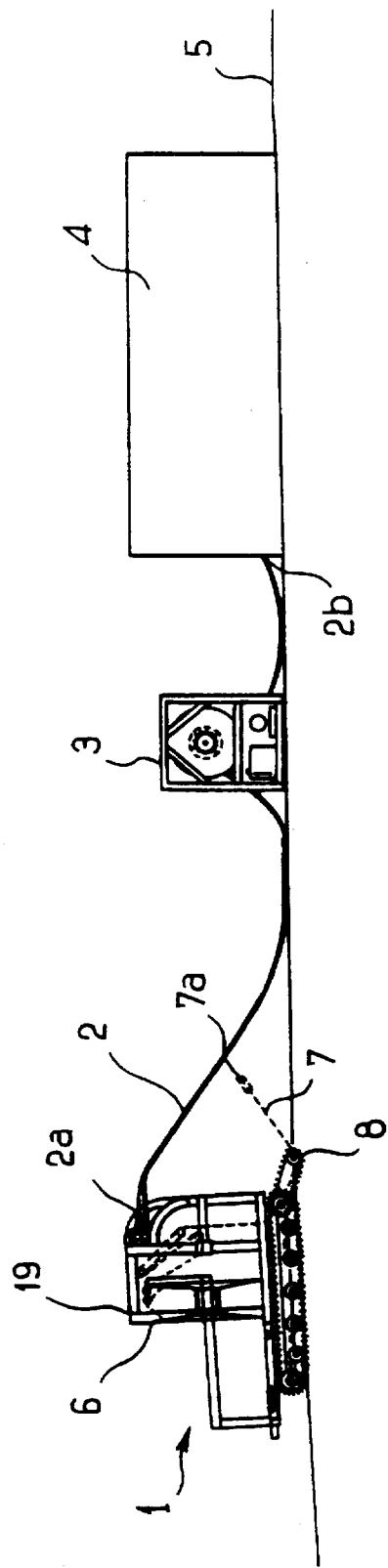
FIG. 1 is a side view of a sea plough controlled from a control unit on land, in a first embodiment of the invention.

The method of continuously laying and burying a flexible conduit such as an optical fibre cable is described with reference to FIGS. 1 through 8 in a first embodiment that entails first burying a part of the optical cable on land and in the sea bed in shallow water, under control from the land.

In this first embodiment, a remote controlled and self-propelled sea plough 1, of the type with caterpillar tracks, for example, is connected to one end 2a of a first umbilical 2 wound on a winch 3 with a rotary joint. The other end 2b of the umbilical 2 is connected to a control unit 4 disposed on the shore 5. A reel 6 of the cable 7 to be buried is mounted on the sea plough 1, the free end 7a being adapted to be attached to a reel, not shown, on which a length of cable for deployment on land can be wound.

In accordance with the invention, the optical fibre cable 7 can have a particularly lightweight structure, typically with an outside diameter in the order of 15 mm to 20 mm, a weight in air in the order of 0.4 tonnes per kilometer to 0.8 tonnes per kilometer and a weight in water in the order of 0.2 tonnes per kilometer to 0.4 tonnes per kilometer. Installation methods used until now require a relatively substantially armouring to protect and reinforce the cable, which in the prior art typically has an outside diameter in the order of 25 mm to 40 mm, a weight in air in the order of 1.3 tonnes per kilometer to 4.5 tonnes per kilometer and weight in water in the order of 0.8 tonnes per kilometer to 3 tonnes per kilometer. Depending on the specifications of the core cable and local conditions at the site where the cable is laid, the invention makes it feasible to lay and bury optical cables that are even lighter in weight, the limiting case being that of a cable with no reinforcing armouring and comprising only the central part of the optical cable, known as the core cable, the weight of the cable in air being as low as approximately 0.1 tonne per kilometer or even less.

The reel 6 can be sized to suit the specifications of the required installation, in particular the dimensions of the optical cable and the length of the cable to be laid, together with the size of the sea plough. The total weight of a reel, including the optical cable wound on it, can vary between a few hundred kilogrammes and a few tonnes. It is therefore possible to store on a single reel several kilometers or several tens of kilometers of optical cable. The length of the optical cable link laid in a single continuous operation from a single reel can be as much as or even more than 50 kilometers, with the weight in air of the sea plough and the reel loaded with cable being only approximately 20 tonnes, with the result that the operation can be carried out using small and cheap vessels of a type in very widespread use for offshore oil production.

The sea plough 1 is controlled by the control unit 4 and begins the first step of laying and burying the cable 7 on land. The sea plough 1 is supplied with power, for example hydraulic or electric power, from the control unit 4 via the first umbilical 2 so that the motor or motors of the sea plough 1 drive(s) the tracks which cause the sea plough 1 to move at a particular speed. As the sea plough 1 moves the reel 6 is rotated to pay out the cable 7 in synchronism with the speed at which the sea plough 1 is moving. As the cable 7 is laid and buried the tension in its is continuously monitored to prevent excessive tension or slack in the cable. Various methods of monitoring the tension in the cable 7 are well known in themselves and for this reason will not be described in detail.

Figure 2:
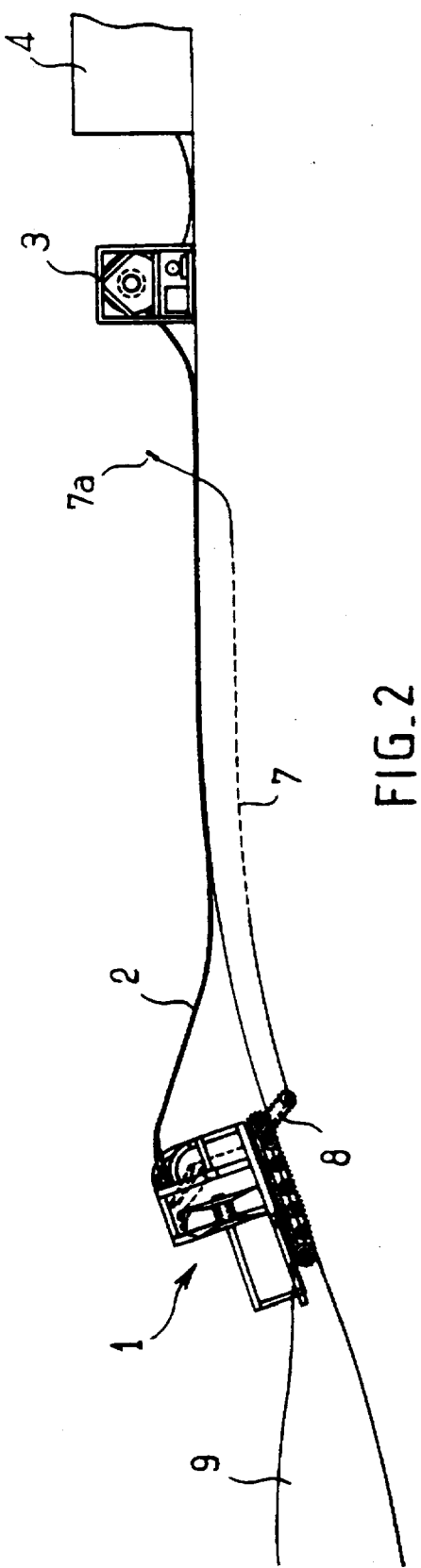
FIG. 2 is analogous to FIG. 1, the sea plough having laid and buried part of the cable.

FIG. 2 shows the sea plough 1 in a position in which part of the cable 7 has been paid out, laid and buried in a trench dug by a trenching tool 8 that can be raised. In this figure the trenching tool is a cutting chain but it could comprise other mechanical means such as wheels or hydraulic means such as arms comprising nozzles for ejecting fluid under pressure, or a combination of such means.

During this stage of laying and burying the cable 7 the umbilical 2 is paid out from the winch 3 and drawn out along the ground as the sea plough 1 moves forward.

The sea plough is shown at the moment of entering the water 9 and has weight and stability characteristics enabling it to withstand the disruptive effects of the current and the swell.

Figure 3A:
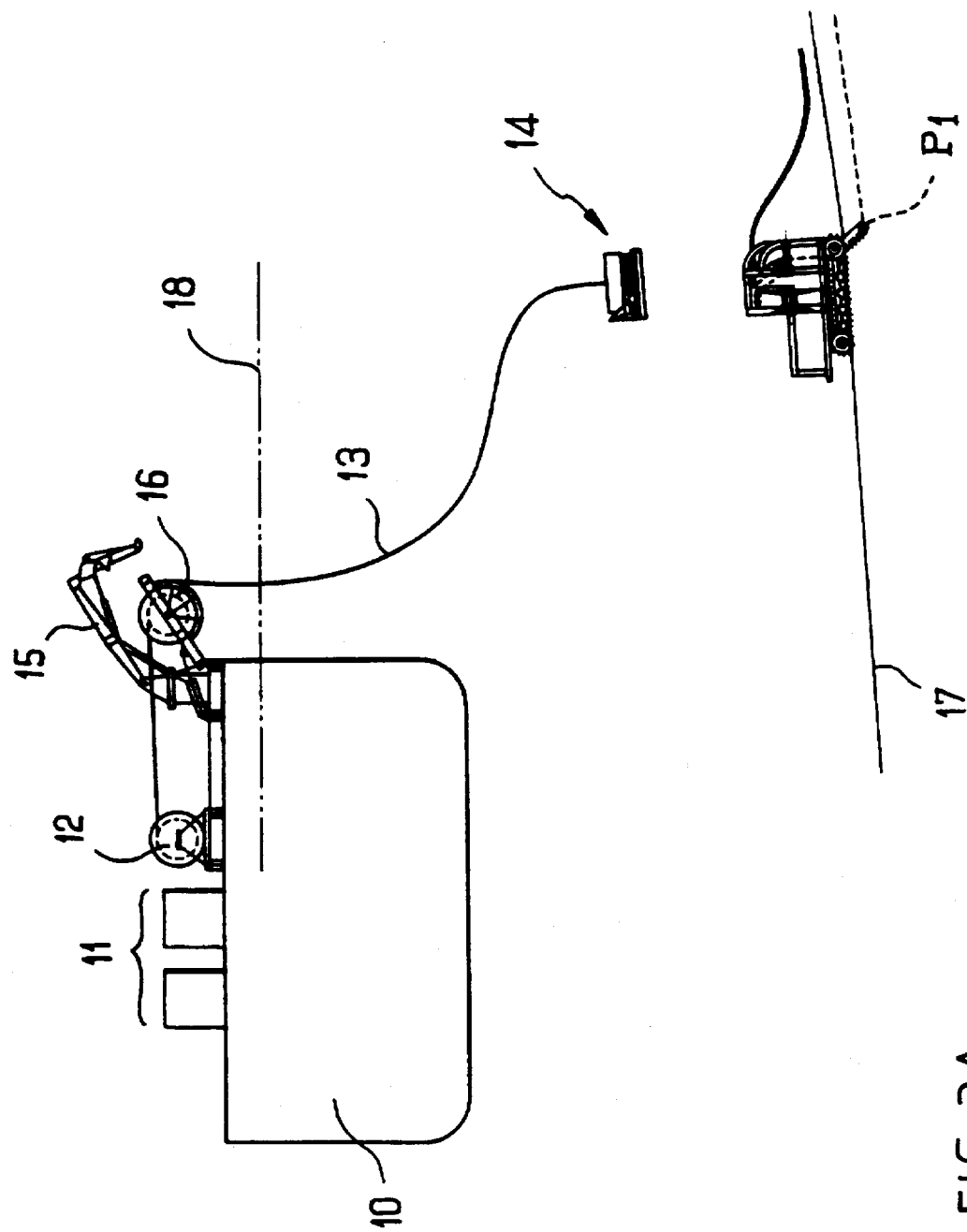
FIGS. 3A and 3B are diagrams showing steps of transferring control of the sea plough from the land to a cable laying vessel.

FIG. 3A shows the sea plough 1 at a first predetermined point $P_1$ in a depth of water such that it is accessible from a cable laying vessel 10. The present invention has the advantage of using various types of specialised vessel developed for other applications such as offshore oil production. These vessels include service vessels, flexible pipeline laying vessels, and underwater works support vessels such as diving support vessels. These vessels are equipped with a dynamic positioning system and combine great manoeuvrability with relatively light displacement.

At the predetermined point $P_1$, the sea plough 1 is stopped under the control of the control unit 4 via the umbilical 2, part of which is shown in FIG. 3A. The cable laying vessel 10 carries a second control unit 11 and a pay-off winch 12 on which is wound a second umbilical 13 the accessible end of which is connected to a robot 14 that has been lowered into the water from the vessel 10 by means of a crane 15, the umbilical 13 being paid out from the winch 12 and passing over a sheave 16 as the distance between the robot 14 and the vessel 10 increases.

The robot 14 is a remote operated vehicle (ROV) available from the American company PERRY TRITECH Inc. This type of vehicle is fitted with buoyancy control means and is entirely remote controlled. Thrusters enable the ROV to move freely between the sea bed 17 and the surface 18. The ROV also carries arms with manipulator tools, vision equipment (TV cameras) and ultrasound location systems.

The ROV 14 has been adapted to carry out certain functions specific to the invention such as connecting the umbilical 13 to the sea plough 1 so that said sea plough 1 can be controlled from the second control unit 11.

In accordance with one feature of the invention, the umbilical 13 provides remote control and remote power feed from the second control unit 11 to both the ROV 14 and the sea plough 1, via a multiplicity of electrical, electronic, hydraulic and other circuits in said umbilical 13.

The ROV 14 locates the sea plough 1 and moves towards it so that it can mount itself on and lock itself correctly to a receptacle provided for this purpose on the sea plough 1. The ROV is adapted to make a water-tight connection between the circuits of the umbilical 13 and the corresponding circuits of the sea plough 1 which at this time is still connected to the control unit 14 on land by the first umbilical 2.

Figure 3B:
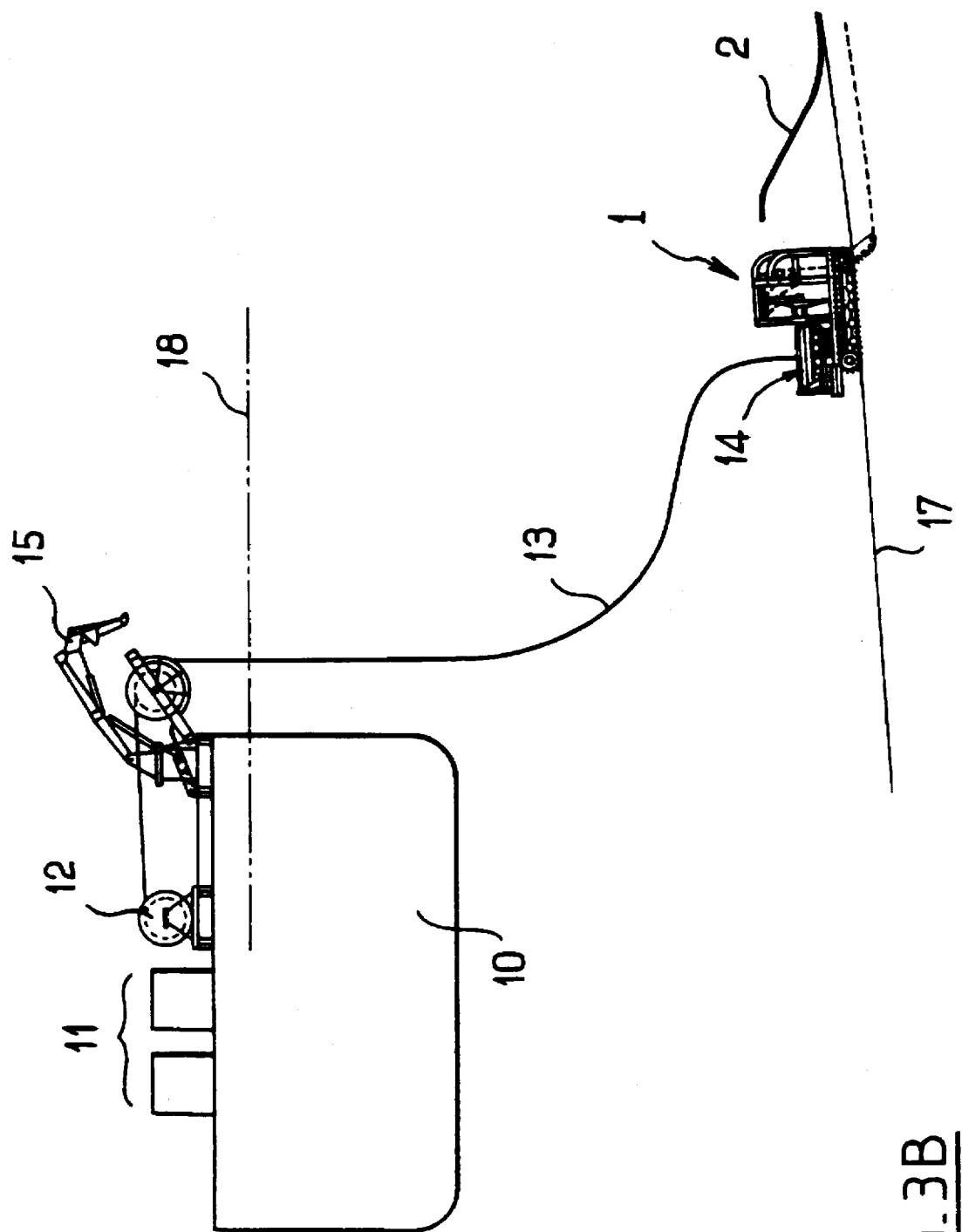

When the ROV 14 has made the connection between the second control unit 11 and the sea plough 1, the first umbilical 2 is disconnected from said sea plough and rewound onto the winch 3 from the land by rotating the winch 3 (FIG. 3B).

The umbilical 2 can be disconnected from the vessel 10 under remote control using appropriate tools on the ROV 14 or appropriate hydraulic and/or electric circuits of the sea plough 1.

When the umbilical 2 has been disconnected the sea plough 1 is controlled only by the second control unit 11 and carries out the second phase of laying and burying the cable 7, as shown in FIG. 4, i.e. as far as a second predetermined point $P_2$ at which laying and burying of the cable is temporarily or permanently stopped.

Figure 5B:
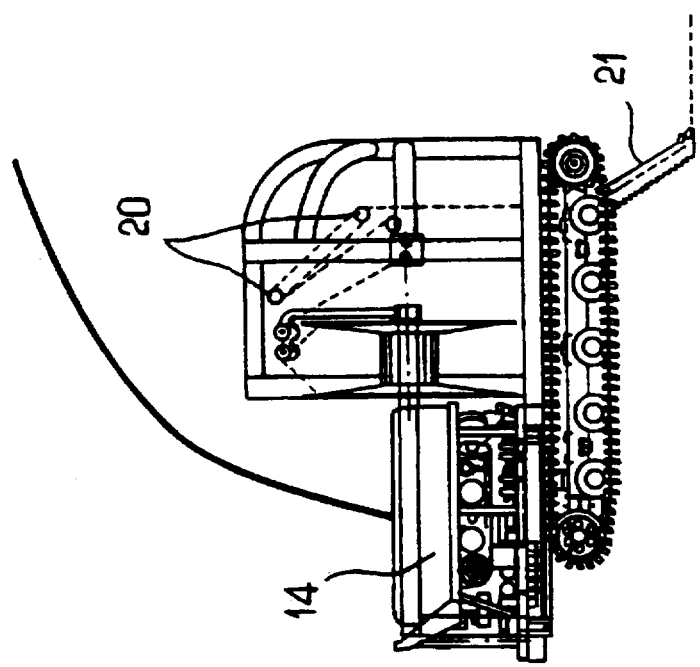
FIGS. 5A and 5B are views to a larger scale of the sea plough and of the robot before and after mounting of the robot on the sea plough.
Figure 5A:
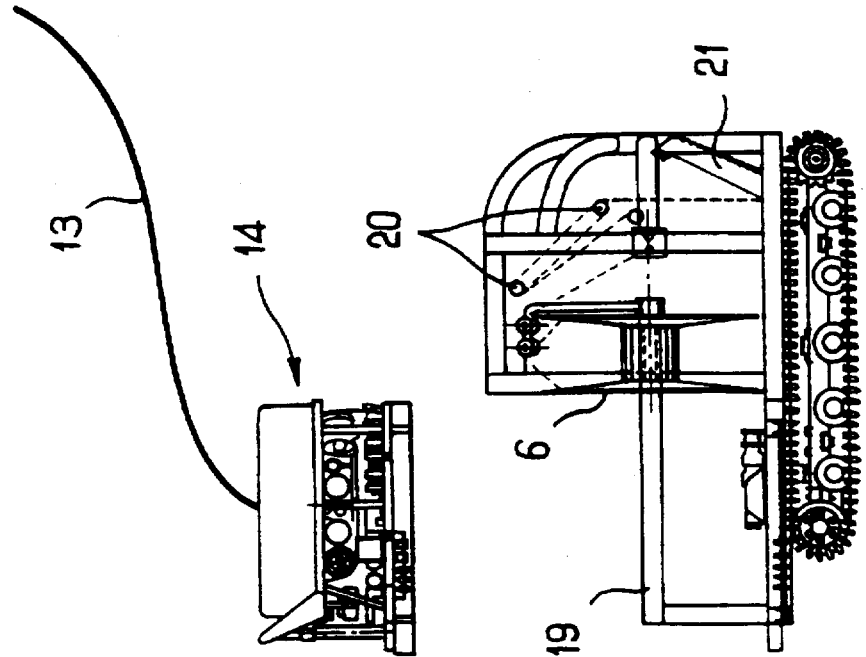

The description so far has made reference to a sea plough 1 fitted with a cutting tool 8 and an ROV 14. FIGS. 5A and 5B show these devices to a larger scale, FIG. 5A showing the ROV reaching or leaving the sea plough 1 and FIG. 5B showing the ROV mounted on and locked onto the sea plough 1, the latter being shown here with different cutting means to those shown in FIGS. 1 through 4.

The sea plough 1 incorporates a plate 19 to support the ROV 14 and a system 20 of optionally motor-driven sheaves for tensioning correctly the cable 7 paid out from the reel 6.

The cutting tool shown in FIGS. 5A and 5B is made up of arms 21 that can be raised and are provided with orifices or nozzles through which a fluid under pressure is directed onto the sea bed to dig a trench into which the cable 7 is laid and in which it is buried. The arms 21 are shown in the raised position in FIG. 5A and in the lowered working position in FIG. 5B.

In a different embodiment, not shown, the umbilical 2 can be disconnected from the land rather than from the cable laying vessel. The means for carrying out this disconnection are known in themselves and are not described in detail. A procedure of this kind enables the control unit 4 to be transferred from the land to the cable laying vessel 10.

It is possible to transfer the control unit 4 to the vessel 10 and to connect it to the second umbilical 13 wound on its winch 12. The umbilical from the vessel can be connected to the sea plough using an independent ROV of the standard type deployed separately from the vessel or using, from the vessel, conduit re-entry devices such as those used in the oil industry, or by divers.

It is also possible to transfer the umbilical 2 only without connection to/disconnection from the sea plough 1, the umbilical 2 being then connected to the control unit 11 available on the vessel, or to transfer it at the same time as the control unit 4 that was previously on land.

When the second phase of laying and burying the cable 7 is completed, the sea plough 1 can be recovered and taken on board the vessel 10 in various ways.

Figure 6A:
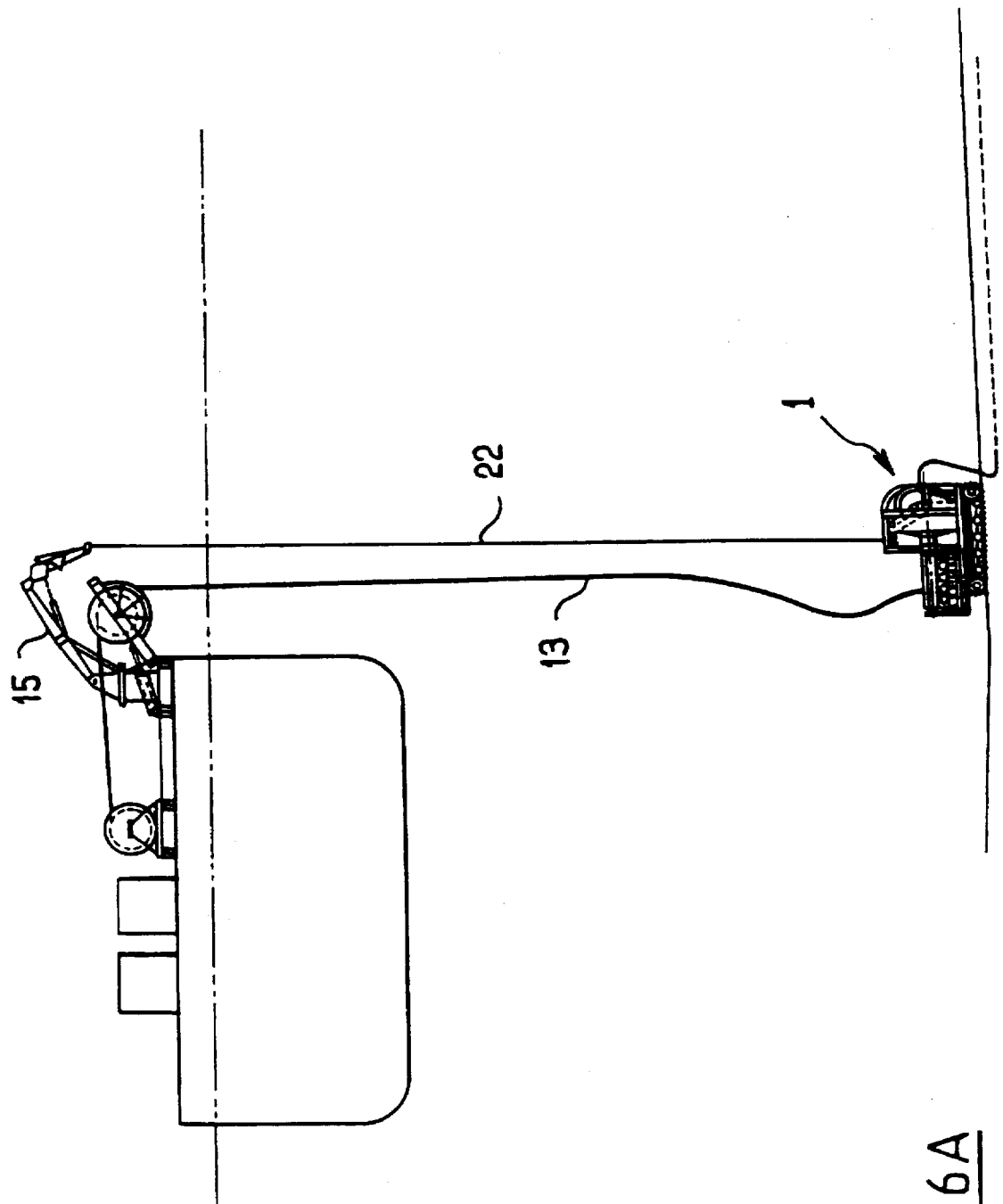

One way is to lower a traction and lifting cable 22 suspended from the crane 15, to attach it to the sea plough 1 by appropriate means (FIG. 6A) and to lift the latter complete with its ROV 14 onto the vessel 10. During lifting of the sea plough 1 the ROV 14 remains connected so that the cable 7 can continue to be paid out at the correct tension until the sea plough 1 is brought on board the vessel (FIG. 6B).

Another method entails releasing the ROV 14 from the sea plough 1, the ROV rising to a certain level in the water to take up one end of the lifting cable 22. In a second phase the ROV descends again to the sea plough 1 to attach the lifting cable 22 to the sea plough (FIG. 7A). Before the ROV 14 rises, a quantity of the cable 7 at least equal to the depth of the water is preferably paid out on the sea bed. When the ROV 14 has been lifted onto the vessel 10, the sea plough 1 is recovered in the manner shown in FIG. 7B, the length of cable paid out and laid onto the sea bed being at this time suspended between the sea plough at the surface and the sea bed.

Recovery of the sea plough 1 enables work to be carried out on the underwater equipment, cable laying and burying being resumed when the underwater equipment has been lowered to the sea bed again, or transfer of the cable 7 to a different vessel such as a cable ship so that it can be connected to another similar cable transported and laid by the cable ship in the usual way, or disconnection of the cable 7 from the sea plough in order to connect it to an offshore structure or to leave it on the sea bed for subsequent connection.

The sea plough 1 is recovered when it is necessary to use the method of the invention to lay and bury a second length of cable 23 separate from the length of cable 7 and stored on a reel 24 different from the reel 6. The cable 7 is then drawn off from the reel 6 and jointed at 25 to the free end of the cable 23, the reel 24 being mounted on the sea plough 1 in place of the reel 6. The means for lowering the sea plough 1 to the sea bed can be identical to any of the lifting means described with reference to FIGS. 6 and 7.

Figure 8:
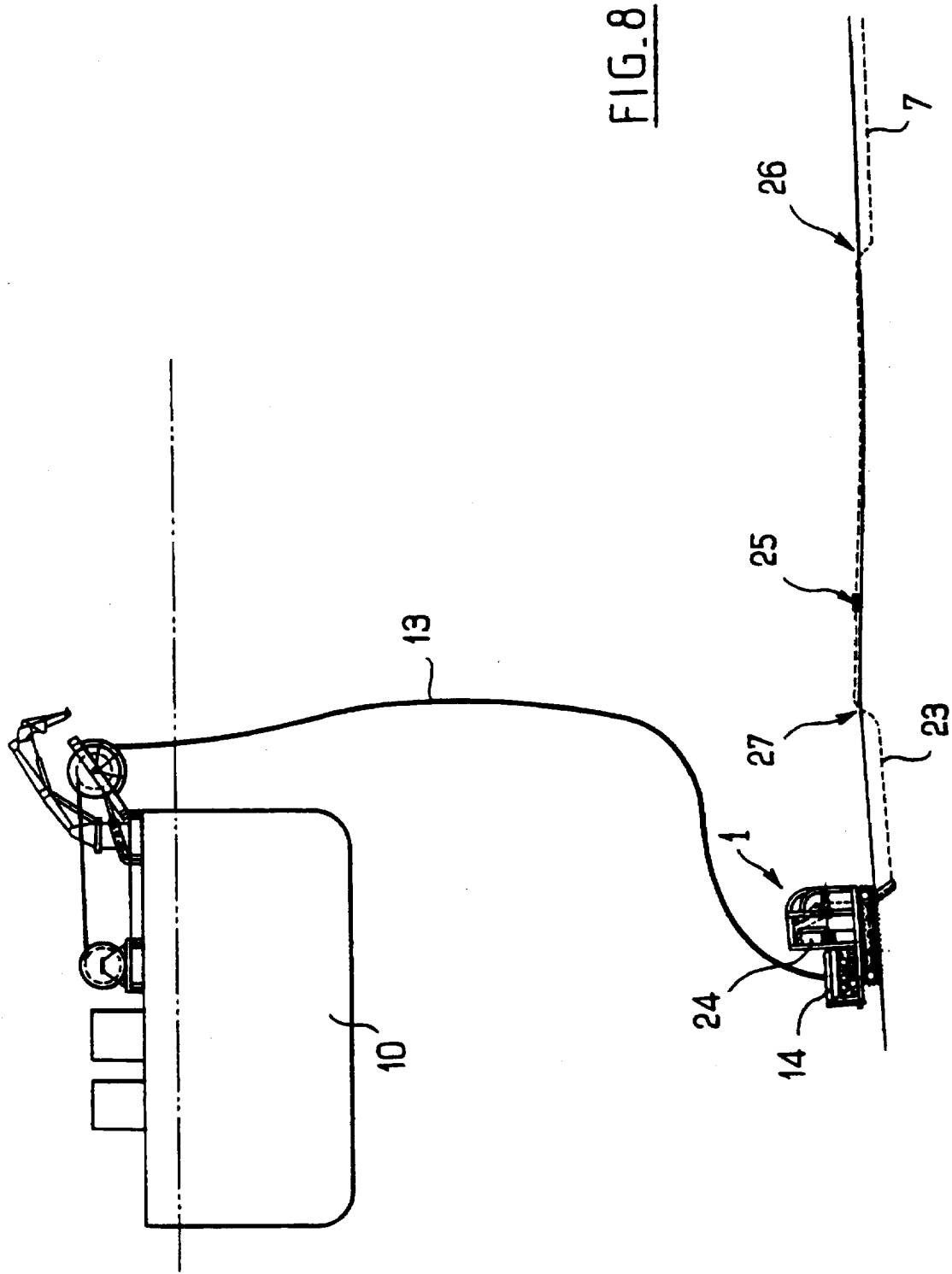
FIG. 8 is a diagram showing a cable laying and burying operation following jointing of another reel of cable.

Between points 26 and 27 between the buried parts of the cables 7 and 23 there is a length of the cables 7 and 23 which normally corresponds to the depth of water and which is not buried (FIG. 8). When burying of the cable 23 has been completed, the length of the cable 7 that remains unburied during burying of the cable 23 can be buried in a subsequent step using the same sea plough 1, using the post-burying technique that is well known in itself.

In one embodiment of the method of the invention, the steps of laying and burying one or more cable sections described with reference to FIGS. 1 through 8 can be followed by another simultaneous laying/burying operation in another landing area on a different shore or site separated from the first land site by a stretch of water. To this end the sea plough 1 is delivered to a predetermined point at the start of the second landing area, to which the vessel 10 has access. The control unit 4 together with the winch 3 and the umbilical are transferred from the first site to the second site. Of course, other analogous or similar means delivered to the second shore could be used. With the sea plough 1 stopped at the previously mentioned predetermined point and still connected to the control unit 11 on the vessel by the umbilical 13 and the ROV 14, the second site umbilical can be drawn to it by various known methods, such as a traction cable fixed to the end of the umbilical, pulled by a winch on the vessel and passing around a pulley attached to the sea plough 1. The umbilical can be connected to the sea plough by the ROV, for example, or by any of the means previously described. The umbilical 13 is then released from the sea plough 1 and rises to the vessel 10 with the ROV 14. The simultaneous laying and burying operation to bring the cable shore is then carried out under remote control from the second shore in the same way but in the reverse order to the similar operation carried out at the first landing site and described hereinabove. Note that in this case, compared to FIGS. 1 and 2, the umbilical 2 is mounted on the side of the sea plough 1 opposite that carrying the cutting tool and the laid cable.

The present invention can also be used in a sea-land operation to lay and bury simultaneously a cable 7 from an offshore site to the shore and comprising in succession offshore laying and burying under the control of the vessel 10 and landing area laying and burying under control from the shore. As in the land-sea operation previously described, the sea end of the cable can be connected to an offshore structure such as a platform or a cable joint laid separately by a cable laying ship in the usual way.

If the offshore simultaneous laying and burying operation has to be interrupted in an emergency, the sea plough 1 can be left on the sea bed with the reel 6 and the laid and buried cable, the vessel 10 being released by disconnecting the ROV 14 and raising it with the umbilical 13. The simultaneous laying and burying of the cable on the reel 6 can be resumed later, using the ROV 14 which can easily locate the sea plough left on the sea bed 1 and guide and connect the umbilical 13 to it.

It is also possible to separate the reel 6 or 24 from the sea plough 1 so that it can be raised onto the vessel 10 at the same time as part of the cable 7 or 23, the sea plough 1 remaining on the sea bed. The sea plough 1 has a reel support frame and an appropriate guiding and locking system and it is therefore possible to lower the reel into place on the sea plough using re-entry methods that are well known in underwater oil production. In particular, the ROV 14 can facilitate this operation.

Although it is not normally intended for installing cables over very long distances such as those covered by intercontinental links where the water is routinely extremely deep, these operations being typically in the domain of cable laying ships, the present invention can be used in deep water, i.e. at depths up to several hundred meters. It is possible to operate in depths exceeding 1000 meters, if necessary, in areas where burying of the cable is not normally required, the current technology of the equipment used, including the umbilicals, allowing this limit to be exceeded.

The method of the invention can be applied to the simultaneous laying and burying of any type of transmission cable, for example coaxial cables for analogue transmission, electric cables or single or multiple flexible tubular conduits of the type available from the applicant.

I claim:

1. Method for continuously laying and burying an underwater flexible conduit, the flexible conduit being stored on at least one reel, said method comprising the steps of:

using a self-propelled sea plough remote-controlled via an umbilical cable, said sea plough carrying said at least one reel of flexible conduit, controlling said sea plough carrying said reel from a site so as to lay and bury a length of the flexible conduit up to a first predetermined point, controlling said sea plough beyond said first predetermined point from another site, and continuing laying and burying of the flexible conduit as far as a second predetermined point, one of said sites being the land and the other comprising a waterborne vessel.

2. Method according to claim 1, wherein the laying and burying of the underwater flexible conduit is controlled using a single control unit which is transferred from one site to the other site.

3. Method according to claim 1, wherein said umbilical cable is transferred from one site to the other site.

4. Method according to claim 1, wherein the flexible conduit is an optical fibre cable.

5. Method according to claim 1, wherein the flexible conduit is laid and buried between two shores separated by a stretch of water and comprising at least two land laying and burying areas and one offshore laying and burying area.

6. Method according to claim 1, wherein the flexible conduit is laid and buried from one shore to an offshore site.

7. Method according to claim 1, wherein the flexible conduit is laid and buried from an offshore site to the shore and comprising at least one offshore laying and burying area and one landing laying and burying area.

8. Method according to claim 1, wherein the flexible conduit comprises at least two separate sections laid and buried one after the other after connecting them.

9. A system for simultaneously laying and burying from shore to water a flexible conduit wound on a reel, said system comprising a self-propelled sea plough remote-controlled via an umbilical cable connected to a first control unit of said sea plough, said first control unit being located at a first site disposed on the shore, the reel being mounted on the sea plough, and a second control unit for controlling said sea plough from another site separate from said first site when said sea plough reaches a first predetermined point to simultaneously lay and bury said flexible conduit in deep water.

10. A system according to claim 9, wherein said sea plough includes means for remotely connecting the sea plough to and disconnecting the sea plough from the umbilical cable that connects the sea plough to one of the control units.

11. Method for continuously laying and burying an underwater flexible conduit, the flexible conduit being stored on at least one reel, said method comprising the steps of:

using a self-propelled sea plough remote-controlled via an umbilical cable, said sea plough carrying said at least one reel of flexible conduit, controlling said sea plough carrying said reel from a site so as to lay and bury a length of the flexible conduit up to a first predetermined point, controlling said sea plough beyond said first predetermined point from another site, continuing laying and burying of the flexible conduit as far as a second predetermined point, one of said sites being the land and the other comprising a waterborne vessel, and using two separate control units, one on the land and the other on the waterborne vessel.

12. Method for continuously laying and burying an underwater flexible conduit, the flexible conduit being stored on at least one reel, said method comprising the steps of:

using a self-propelled sea plough remote-controlled via an umbilical cable, said sea plough carrying said at least one reel of flexible conduit, controlling said sea plough carrying said reel from a site so as to lay and bury a length of the flexible conduit up to a first predetermined point, controlling said sea plough beyond said first predetermined point from another site, continuing laying and burying of the flexible conduit as far as a second predetermined point, one of said sites being the land and the other comprising a waterborne vessel, and controlling the sea plough from the land via the umbilical cable and from the waterborne vessel via another umbilical cable, said another umbilical cable being mounted on an underwater robot at an end opposite the waterborne vessel so that the underwater robot can be connected to the sea plough for controlling the sea plough from the waterborne vessel.

13. Method according to claim 12, wherein the robot is controlled via said another umbilical cable.

14. Method according to claim 13, wherein the robot is adapted to disconnect said umbilical cable.

15. Device for simultaneously laying and burying a flexible conduit wound on a reel, said device comprising:
- a self-propelled sea plough remote-controlled via an umbilical cable connected to a first control unit of said sea plough, said first control unit being located at a first site, the reel being mounted on the sea plough,
- a second control unit for controlling said sea plough from another site when said sea plough reaches a fist predetermined point to simultaneously lay and bury said flexible cable in deep water,
- means for remotely connecting the sea plough to and disconnecting the sea plough from the umbilical cable that connects the sea plough to one of the control units, said means including a self propelled remote-controlled robot adapted to be mounted on the sea plough and to make watertight connections between said umbilical cable and the sea plough, said umbilical cable being connected to one of the control units at one end and mounted on said robot at its other end.

16. Device according to claim 15, wherein said device includes another umbilical cable incorporating control circuits for the robot and the sea plough.

* * * * *